UNITED STATES PATENT OFFICE.

THEODOR SETH WENNAGEL, OF ALT-RAHLSTEDT, NEAR HAMBURG, GERMANY, ASSIGNOR TO THE FIRM OF NAAMLOOZE VENNOOTSCHAP HOLLANDSCHE PROTEINE MAATSCHAPPIJ, OF AMSTERDAM, NETHERLANDS.

PHENOL-ALDEHYDE CONDENSATION PRODUCT.

1,273,967.  Specification of Letters Patent.  Patented July 30, 1918.

No Drawing.  Application filed January 22, 1917. Serial No. 143,853.

*To all whom it may concern:*

Be it known that I, THEODOR SETH WENNAGEL, a subject of the German Emperor, and resident of Alt-Rahlstedt, near Hamburg, German Empire, have invented certain new and useful Improvements in Phenol-Aldehyde Condensation Products, whereof the following is a specification.

The up to date known processes of manufacturing the products of the condensation of phenols and aldehydes present the drawback that, under the action of light and air, intermediate pigments are formed in the ready product, which pigments alter the superficial color of the same, unless troublesome cleaning processes or carefully purified raw materials have been made use of in the manufacture of the pastes.

According to the old process it was necessary to employ pure crystalline phenol for obtaining transparent products of condensation. But even the proposals tending to apply mineral acids as a condensing means did not produce any unobjectionable result. The products obtained in this manner had to be submitted, after the condensation, to a difficult cleaning process, for the purpose of preventing that free mineral acids would remain in the final product.

In contradistinction to the hereinbefore described processes the new method, according to my invention, affords the possibility of obtaining, from comparatively crude raw materials and without complicated cleaning processes or the like, a superior product of a very great resistance to the action of light and air and, besides is, adapted to harden in a better manner by far than the hitherto known products, so that now, with the application of pressure, even bigger lumps may in a short time be sufficiently hardened. According to my invention this result is attained in that the neutral alkali salts of the aromatic oxyacids in small quantities are made use of as condensing means, especially the neutral alkali salts which are not hydrolytically disassociated.

The quantities to be taken are preferably selected so as to be about the 1/25 part of the weight of the phenol to be made use of. Special care must be taken that the salts employed in this process are in a very high degree neutral, as even small excesses of free alkali, hence also the basic salts of the aforesaid acids, influence the final product in such a degree that it shows changes in its color.

A further progress due to my invention consists therein that one can obtain clear transparent final products, even with the use of crude carbolic acids (cresols).

As aromatic acids, the salts of which may be used, the following may be considered: oxybenzoic acids, tannic acids and the like.

As an example the new process may be carried out as follows:

In a boiler 100 parts of phenol, 80 parts of formic aldehyde of 40% and from 5–10 parts of an aqueous solution (50%) of quite neutral salicylate of potassium or sodium are carefully mixed and heated till the reaction takes place. As the latter is of a tolerably violent nature, the heating of the boiler is reduced during said reaction. After its conclusion, the water, contained in the raw materials employed, will be expelled, whereupon the paste or mass may be cast into molds. The product of the reaction is quite liquid and may be hardened, for instance, in open molds at a temperature of from 60–80° C. a result to be obtained in about 12 hours.

What I claim as my invention and desire to secure by Letters Patent is:—

1. The process of obtaining phenol aldehyde condensation products, which consists in using the neutral alkali salts of the aromatic oxyacids as condensing means.

2. The process of obtaining phenol aldehyde condensation products, which consists in using the neutral alkali salts of the aromatic oxyacids which are not hydrolytically disassociated as condensing means.

In testimony whereof I have signed this specification in the presence of two subscribing witnesses.

THEODOR SETH WENNAGEL.

Witnesses:
HENRY HASPER,
ARTHUR F. JENNINGS.